(12) United States Patent
Godbehere et al.

(10) Patent No.: US 11,147,260 B2
(45) Date of Patent: Oct. 19, 2021

(54) COLD GAS SYSTEM FOR FUMIGATING SOIL

(71) Applicants: John Stephen Godbehere, Ochlocknee, GA (US); Dean C. Storkan, Monterey, CA (US)

(72) Inventors: John Stephen Godbehere, Ochlocknee, GA (US); Dean C. Storkan, Monterey, CA (US)

( * ) Notice: Subject to any disclaimer, the term of this patent is extended or adjusted under 35 U.S.C. 154(b) by 275 days.

(21) Appl. No.: 16/352,084

(22) Filed: Mar. 13, 2019

(65) Prior Publication Data

US 2019/0281808 A1 Sep. 19, 2019

Related U.S. Application Data

(60) Provisional application No. 62/642,242, filed on Mar. 13, 2018.

(51) Int. Cl.
*A01M 13/00* (2006.01)
*A01N 25/18* (2006.01)
*A01M 17/00* (2006.01)

(52) U.S. Cl.
CPC .......... *A01M 13/00* (2013.01); *A01M 17/002* (2013.01); *A01N 25/18* (2013.01)

(58) Field of Classification Search
CPC ...... A01M 13/00; A01M 17/002; A01N 25/18
See application file for complete search history.

(56) References Cited

U.S. PATENT DOCUMENTS

| 3,782,026 | A | * | 1/1974 | Bridges et al. | A01M 13/00 43/124 |
| 5,753,494 | A | * | 5/1998 | Hater et al. | B09B 3/00 405/128.5 |
| 5,846,904 | A | * | 12/1998 | Imai et al. | A01N 25/18 504/361 |
| 2015/0305321 | A1 | * | 10/2015 | Weis | A01N 25/02 111/120 |

* cited by examiner

*Primary Examiner* — Tara Mayo-Pinnock
(74) *Attorney, Agent, or Firm* — William E. Noonan

(57) ABSTRACT

A system for fumigating soil includes applying a fumigant film component and an underlying drip tape element to the soil to be treated. A non-tarp method can also be used through permanently buried drip tape (SDI) that is at least 8 inches deep and utilizes the soil above as the barrier to prevent the fumigant from escaping. The drip tape element is communicably connected through a throttle valve to a pressurized liquid supply of fumigant having a low boiling point and a high vapor pressure. The valve is opened to dispense vaporized fumigant into the soil and dissipation of the fumigant is controlled so that more effective soil fumigation is achieved.

20 Claims, 3 Drawing Sheets

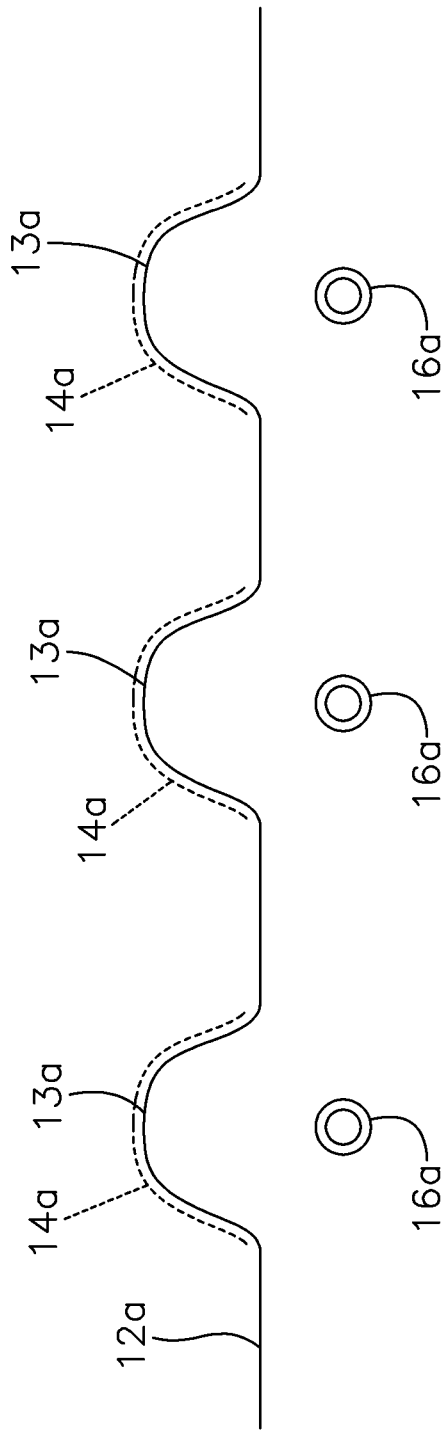

COLD GAS SYSTEM FOR FUMIGATING SOIL

RELATED APPLICATION

This application claims the benefit of U.S. Provisional Patent Application Ser. No. 62/642,242 filed Mar. 13, 2018.

FIELD OF THE INVENTION

This invention relates to a system for fumigating soil and, more particularly, to a method and apparatus that utilizes a "cold gas" fumigant having a low boiling point and high vapor pressure to perform soil fumigation more effectively and safely.

BACKGROUND OF THE INVENTION

Due to environmental, health and safety concerns, the use of methyl bromide as a soil fumigant for treating agricultural planting sites has become increasingly restricted. Recently, some new compounds, ethanedinitrile (EDN) and sulfuryl fluoride (SF) have been considered as soil fumigant replacements for methyl bromide. These gases feature low boiling points and high vapor pressures, which would hinder their effective use in conventional soil fumigation processes. When standard shank injection is employed, existing fumigants are typically injected into the soil as a liquid or a liquid under pressure. In contrast, these potentially new fumigants volatize rapidly into a gaseous state. When expanding from a liquid to a gas, they cool very rapidly. This produces a refrigeration effect that can cause disruptive freezing in and around the tubing, injection shanks and other equipment used for fumigation. By the same token, rapidly vaporizing fumigants dissipate fairly quickly into the atmosphere and can be lost before the soil is covered by an appropriate gas retaining tarp. The tarp can cover the entire field (broadcast tarp) or only the raised bed (mulch tarp). The effectiveness of such fumigants is therefore reduced considerably. This problem is, in fact, already encountered with some existing soil fumigants. It will likely be exacerbated if low boiling point/high vapor pressure gases such as EDN and SF are involved in soil fumigation. Moreover, as highly volatile fumigant gases dissipate from the soil, they can constitute a health hazard that may drift offsite or expose the fumigant applicators.

Current alternative soil fumigation application techniques include emulsification of the fumigant using drip irrigation systems. These methods require the use of large amounts of water. However, many agricultural fields requiring soil fumigation are located in areas where water usage is limited and/or heavily regulated. In many applications, emulsified fumigants are applied to the soil through the same drip irrigation system that is used for irrigating the crop. Currently available fumigants can settle out of solution in low areas if they are not properly applied and can severely damage PVC pipes and other components of the irrigation system. This can be an acute problem when there is a significant dip in the drip irrigation system or an increase in pipe elevation.

SUMMARY OF THE INVENTION

It is therefore an object of the present invention to provide a system for fumigating soil which more effectively controls the dissipation of gaseous fumigants from the soil of an agricultural site into the atmosphere so that improved and more efficient fumigation is achieved.

It is a further object of this invention to provide a system for fumigating soil which greatly reduces the potential for exposure of human applicators to fumigants and reducing any possible harmful effects caused thereby.

It is a further object of this invention to provide a system for fumigating soil that, does not require the use of water during the fumigant application process and which therefore is highly beneficial for use in areas where the supply of water is limited.

It is a further object of this invention to provide a system for fumigating soil of an agricultural site wherein the fumigant is not applied to the soil through drip irrigation systems or other irrigation equipment used for the agricultural site and which therefore eliminates the potential for causing damage to such equipment.

It is a further object of this invention to utilize sub-surface drip irrigation tape (SDI) to deliver volatile fumigants such as EDN and SF deeper into the soil profile to improve their efficacy as nematocides and fungicides in areas where nematodes and fungi reside. This will be accomplished either with or without a tarp, utilizing the soil above the point of injection to improve retention of the fumigant.

It is a further object, of this invention to provide a method of soil fumigation that does not require the application of heat and the use of heat generating equipment such as a heat exchanger to vaporize the fumigant during application.

It is a further object of this invention to provide a "cold gas" soil fumigation system that allows for safe and effective use of low boiling point and high vapor pressure fumigants not previously available for soil fumigation and that enables such fumigants to be effectively delivered to a planting site in liquid form and without causing, disruptive freezing of the fumigant conducting equipment.

It is a further object of this invention to provide a system for fumigating soil wherein, following application of the fumigants, residual fumigant remaining in the apparatus equipment is effectively and efficiently flushed into the soil using compressed air so that less fumigant is wasted, a more effective and efficient application is achieved, and applicators are not exposed to any fumigant remaining in the application equipment (e.g. manifold, piping).

It is a further object of this invention to provide a system for fumigating soil that can be used to automatically measure and regulate the amount of fumigant being applied to the soil being treated.

It is a further object of this invention to provide a system for fumigating soil that is both safer and, more effective than existing techniques.

This invention features a system for fumigating soil in an agricultural field or other planting site. The fumigant has a low boiling point of not greater than 0 degrees centigrade at atmospheric pressure and a high vapor pressure. At least one fumigation film component may be applied across an area of soil to be treated. A drip element is disposed beneath the film component in engagement with the soil. A fumigant conducting line is communicably connected between an inlet of the drip element and a cylinder or other pressurized source of the fumigant in liquid form. A valve connected to the fumigant conducting line is selectively opened to permit the liquid fumigant to vaporize and be transmitted through the fumigation conducting line from the fumigant source to the drip element, which applies the fumigant in gaseous form to the soil. The valve is selectively closed to retain liquid fumigant in the cylinder or other fumigant source and block transmission of the fumigant from the fumigant source to the drip element. The fumigation film component and underlying drip element are applied to the soil before the valve is opened and before fumigant is transmitted as a gas through the fumigant conductor line to, the drip element for introduction into the soil.

In a preferred embodiment, the fumigant has a boiling point not greater than 0 degrees centigrade and preferably between minus 80 degrees centigrade and 0 degrees centigrade at atmospheric pressure. The fumigant may exhibit a vapor pressure between 35 atmospheres and 1 atmosphere. The fumigant may be contained in a pressurized fumigant cylinder, which may be supported on a scale for determining the weight of the fumigant remaining in the container and therefore the amount of fumigant applied to the site being treated. The valve is operated to transmit fumigant through the conducting line to the drip element at a controlled rate that limits, and in some cases totally restricts moisture in and around the conducting line from freezing and disrupting the flow of the gaseous fumigant through the fumigant conducting line to the drip element.

A plurality of film components and respective drip elements may be communicably interconnected to the fumigant source. Each fumigant film component and respective drip element may be associated with and cover a respective area (e.g. bed or row) in a planting site. Each drip element may be communicably connected by a respective fumigation conduit to a fumigation manifold, which is itself communicably connected to the source of fumigant. The fumigation manifold distributes fumigant from the fumigant source to the drip elements, which in turn, dispense fumigant into the soil beneath the fumigant film components.

Each fumigant conduit may include polyethylene ("poly") tubing or an alternative conducting line that may be either connected directly to the manifold or retractably wound on an associated reel that allows the poly line to be selectively extended or retracted relative to the manifold the manifold. The manifold is, in turn, communicably connected to the cylinder or other pressurized source of fumigant through the valve, which may include a throttle valve.

The fumigation film may include various types of components such as bed mulch, broadcast film, fumigation tarps, etc. Typically, the film component comprises a totally impermeable film ("TIF"). The drip element may include a drip tape, tubing, piping or other form of conductor having dispensing orifices formed at 12 inches apart or alternative length intervals. The drip element may be connected to the poly line by a standard quick connect element of the type conventionally used in the agricultural industry. Typically, the drip element is buried approximately 1 inch below the surface of the soil, but in the case of broadcast fumigation is placed on the surface of the soil under the broadcast film.

An air compressor may be communicably connected between the valve and the fumigation manifold. Typically, the system is operated by opening the valve to deliver fumigant to the manifold and then to the drip elements via the respective poly line conduits. After the desired amount of fumigant is dispensed, the valve is closed and the air compressor is operated to force residual gaseous fumigant remaining in the fumigant conductors and drip elements into the soil.

For applications wherein a large volume of fumigant is applied, a radiator may be utilized between the valve and the fumigation manifold. The radiator is operated to further counteract the refrigeration effect generated when the fumigant exits the valve and rapidly expands to atmospheric pressure. The radiator controls the temperature of the expanding gas so that the line resists freezing and the fumigant is fully and properly dispensed by the system.

The fumigant cylinder, scale, valve, air compressor, radiator and manifold may all be supported on a trailer. The poly line conductors communicably interconnect the manifold with the respective drip tape elements engaging the beds or other areas of soil to be treated. When operating the system, it is important that the fumigation film component(s) and underlying drip tape element(s) first be applied across the site to be treated before the fumigant is delivered. In this way, after the low boiling temperature/high vapor pressure fumigant is dispensed from the drip tape or other drip element, it is immediately and effectively retained by the fumigation film within the soil so that fumigation is most effectively achieved. Also, farm workers are able to remain completely clear of the agricultural site while the fumigant is being applied. This greatly improves applicator safety.

In alternative embodiments of this invention, fumigant having a low boiling point and high vapor pressure is introduced into the soil in a controlled-rate manner by a sub-surface irrigation drip tape, pipe or other type of drip element (SDI) connected to a fumigant cylinder or other source as previously described. The SDI drip element may be permanently buried at a depth typically greater than 8 inches deep (e.g. 8-10 inches) and, in such cases, preferably utilizes the soil above the drip element in lieu of a tarp or film component to retain the fumigant in the soil. In most cases a soil bed is formed on the level top surface of the soil above the buried drip element. In some cases, a plastic bed mulch may be applied over the soil in which the SDI element is buried. Alternatively, bed mulch may be omitted.

BRIEF DESCRIPTION OF THE DRAWINGS

Other objects, features and advantages will occur from the following description of a preferred embodiment and the accompanying drawings, in which:

FIG. 3 is a cross sectional view of a permanently buried system of SDI drip tape elements for applying fumigant in accordance with this invention.

DETAILED DESCRIPTION OF PREFERRED EMBODIMENTS

Figure 1:
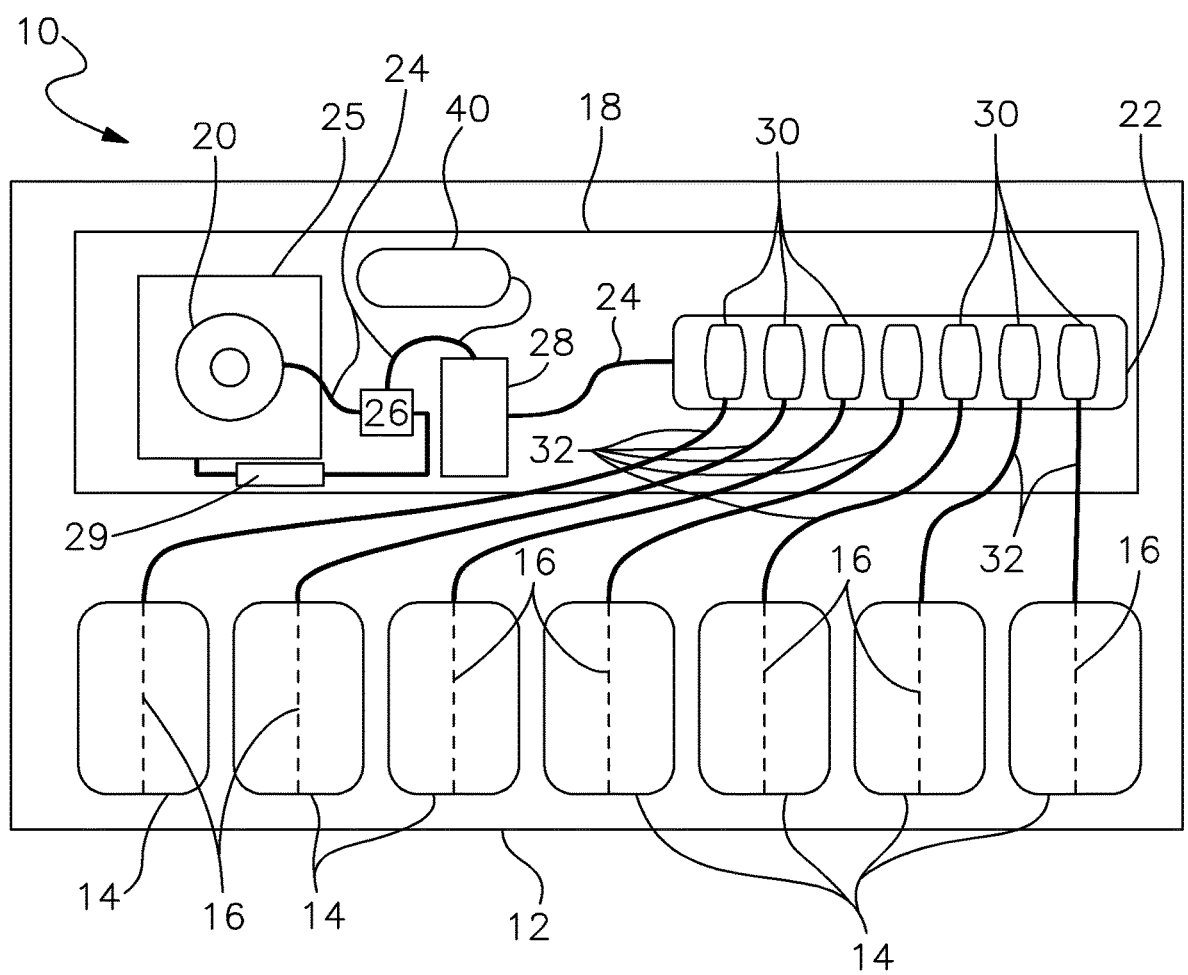
FIG. 1 is a schematic view of the system for fumigating soil in accordance with this invention.

There is shown in FIG. 1 a system 10 for fumigating the soil of an agricultural field or other planting site 12. The site may feature any variety, shape and/or size of an agricultural field or other site for growing various crops. The size, shape and type of the site and types of crops involved do not constitute limitations of this invention.

Site 12 includes a plurality of plant or crop supporting rows or beds covered by respective fumigation film components 14. Each film component may include any one of a variety of different types of bed mulch, broadcast film or fumigation tarp. A preferred material is TIF film of the type that is commonly used in the soil fumigation industry. The length and width of each film component may vary within the scope of this invention. In each case, the fumigation film extends across and covers a respective bed.

An elongated drip element 16 is disposed beneath each film component 14 and engages the underlying soil of the bed. Each drip element, which is also commonly referred to as drip tape or drip line, may comprise an elongate hose, tubing, pipe or similar item of the type known and used in irrigation and fumigation applications. As used herein, "drip element" and "drip tape element" should be understood to include any and all such components. Typically, a plurality of fumigant emitting or dispensing holes are formed at approximately 12 inch intervals or at other spacings along each drip tape element. The drip tape element typically is not mechanically secured to its associated film component, but rather is preferably disposed between film component 14 and the top surface of the soil or buried up to about 1 inch beneath the upper surface of the soil. Each drip tape element should be generally as long as its corresponding film component.

A fumigant supply trailer is positioned adjacent to the fumigant film components 14, which are themselves shown arranged to respectively cover generally parallel adjoining rows or beds of fields 12. Trailer 18 supports a fumigant source or supply 20. Typically, a pressurized cylinder 20 accommodates a soil fumigant in liquid form. The fumigant has a low boiling point (e.g. minus 80 degrees centigrade to 0 degrees centigrade at atmospheric pressure) and a high vapor pressure (e.g. 35 atmospheres to 1 atmosphere). Preferred fumigants include compounds that have not previously been available for use as soil fumigants. These include, but are not limited to ethanedinitrile (EDN) featuring a boiling point of −21.7° C. at atmospheric pressure and sulfuryl fluoride (SF), having a boiling point of −55.2° C. at atmospheric pressure. Alternative low boiling point, high vapor pressure fumigants may be employed within the scope of this invention. Cylinder 20 is mounted on a scale 25, which effectively measures the loss in weight of the fumigant in the cylinder as it is being dispensed in accordance with this invention. This indicates when a required dose of fumigant has been delivered to the field.

Trailer 18 also supports a fumigant distribution manifold 22 which may comprise a series of pipes communicably interconnected to cylinder 20 by a fumigant conducting or transmission line 24. This line may comprise a pipe, hose or tube suitable for conducting fumigant gases. More particularly, line 24 extends between cylinder 20 and manifold 22 through an intervening throttle valve 26 and a radiator 28. Valve 26 and radiator 28 may comprise various conventional components within the scope of this invention. Various alternative types of valves may be employed. Valve 26 may be automatically controlled by a programmable controller 29, which may comprise a microprocessor or other form of control mechanism. The operation of these components is described more fully below.

A plurality of hose reels 30 are mounted on manifold 22. Each reel, windably supports a respective flexible fumigant conducting conduit 32, which may itself comprise a poly line or other type of hose or conduit. One end of each conduit 32 is communicably connected to manifold 22 and thereby to fumigant conducting line 24. The opposite end of each conduit is similarly communicably connected to an inlet of a respective drip tape element 16. Each poly line is unwound from a respective reel 30, FIG. 1, by an amount needed to reach and attach to the corresponding drip tape element. It should be noted that, in alternative embodiments, a single large reel may be used to support all of the poly line conduits, rather than individual reels as shown in FIG. 1. Line 24, manifold 22, conduits 32 and drip tape elements 16 are communicably joined together by appropriate types of communicable connectors, such as quick connect elements or other standard coupling components that will be known to persons skilled in the art, Interconnected line 24, manifold 22 and polytube conduits 32 thereby define a fumigant conductor for delivering fumigant in a gaseous state from cylinder 20 to drip tape elements 16 as described below.

Figure 2:
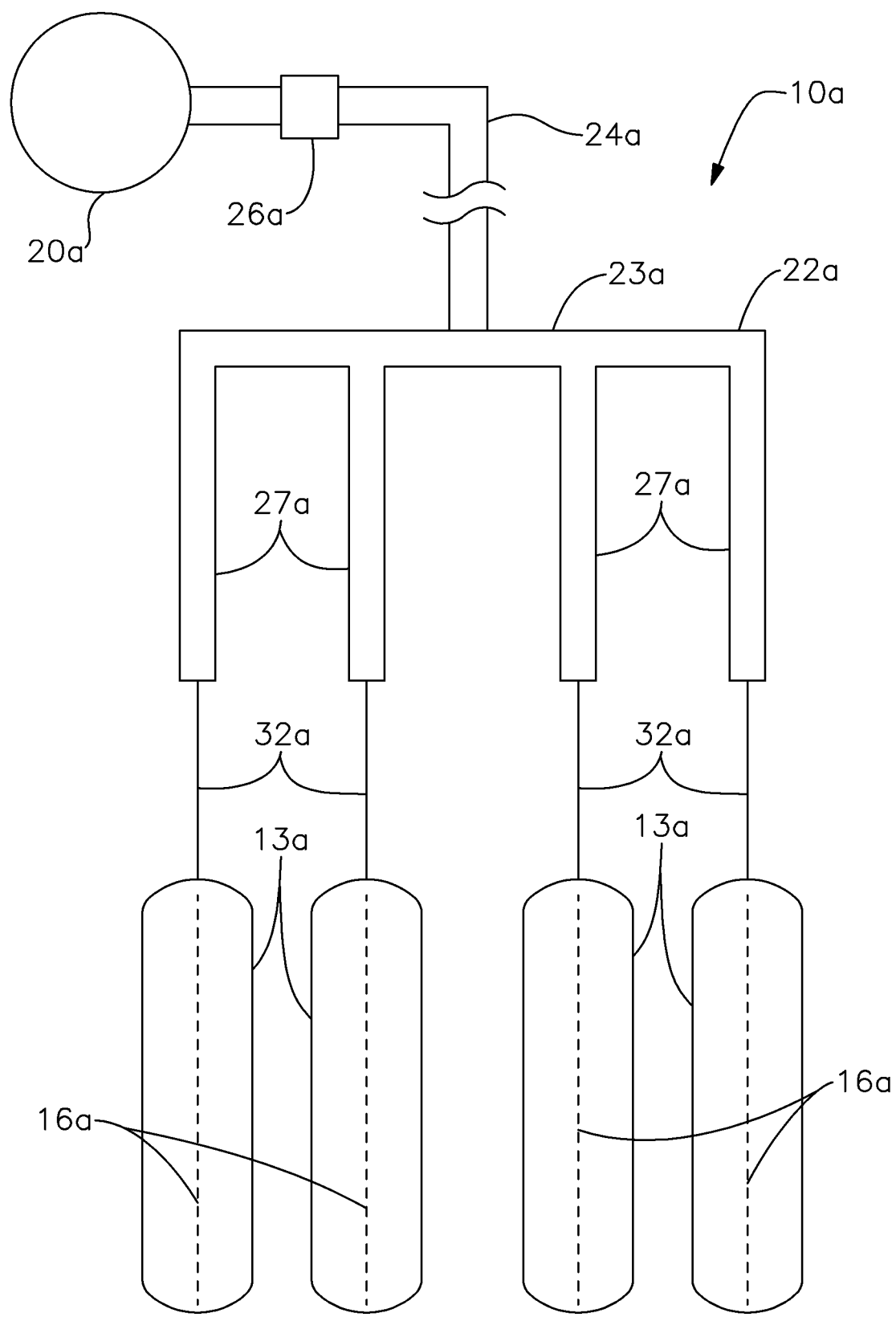
FIG. 2 is a schematic view of an alternative version of the soil fumigant system.

In the alternative SDI version shown in FIGS. 2 and 3, a manifold 22a features a main distribution pipe segment 23a having a plurality of branch pipe segments 27a connected communicably thereto. Any number of branch pipe segments may be employed and, in the depicted version, each is communicably and directly attached without a reel to a respective fumigant transmission conduit 32a that is, in turn, communicably connected to an associated sub-surface drip irrigation (SDI) tubing or tape element 16a. Each SDI element 16a is buried permanently in the soil. As used herein, "permanently" should be understood to mean a long term period of at least about 8-10 years. Typically, each SDI drip tape is buried in the soil at a depth of at least 8 inches and preferably 8-10 inches below the flat surface of planting site 12. A planting bed 13a is then typically formed on the level, top surface of the soil above each drip tape element 16a. In alternative versions, the planting beds may be omitted. Moreover, in the SDI system depicted in FIGS. 2 and 3, a plastic mulch 14a may be optionally, but not necessarily formed above each bed 13a or otherwise above the soil covering the respective drip tape elements 16a. SDI elements 16a have discharge openings spaced longitudinally at intervals of about 12 inches.

Pressurized fumigant cylinder 20a, which accommodates a low boiling point/high vapor pressure fumigant in liquid form, is communicably connected to manifold 22a by a fumigant conducting/transmission line 24a. Manifold 22a is, in turn, communicably joined to conduits 32a, which are themselves communicably connected to respective SDI drip tape elements 16a. Fumigant is selectively delivered through conducting line 24a to the manifold 22a and thus through the respective conduits 32a and attached SDI drip tape elements 16a by opening a throttle valve 26a. It should be understood that the SDI system shown in FIG. 2 may employ means such as shown in FIG. 1 for communicably and operatively interconnecting the fumigant cylinder with the respective drip tape elements. By the same token, the version shown in FIG. 1 may employ the means depicted in FIG. 2 for operatively and communicably interconnecting the pressurized fumigant cylinder 20 and the drip tape elements 16.

Fumigation systems 10, 10a are installed and operated to apply fumigant to the soil of respective sites 12, 12a in the following manner. In the film tarp version (FIG. 1), drip tape elements are installed on the surface or up to about 1 inch deep in the soil of respective beds or rows of the site. The installer then applies a film component 14 across each bed and above, a respective drip tape element 16 such that the underlying drip tape element extends generally medially or longitudinally through the row or bed and relative to the film component. In the SDI version (FIGS. 2, 3), each drip element 16a is permanently buried preferably about 8-10 inches below the flat upper surface of the soil. The farmer or planting site operator may form a bed 13a over each drip tape element 16a. An optional plastic mulch may be applied over the bed.

Each drip tape element 16, 16a is communicably coupled to a respective poly line conductor 32, 32a. Applicators are removed a safe distance from the site. An applicator then opens throttle valve 26, 26a to commence delivery of fumigant from fumigant cylinder 20, 20a to the respective drip tape elements 16,16a. The throttle valve may be operated either manually or using automated microprocessor controls (i.e. controller 29, FIG. 1) known to persons skilled in the art. With the valve 26, 26a open, liquid under great pressure expands and vaporizes as it passes through the valve and enters fumigant transmission line 24, 24a. The gaseous fumigant flows through line 24, 24a from the supply cylinder 20, 20a to the manifold 22, 22a. It is very important that the highly volatile fumigant be released at a sufficiently slow rate that is carefully controlled or regulated, such as by controller 29, FIG. 1, to limit, and ideally prevent moisture, consisting of water and water vapor in and surrounding the fumigant conducting line, from freezing and potentially blocking or disrupting the flow of gaseous fumigant through the line to the connected dispensing drip tape. In some cases, such as shown in FIG. 1, the fumigant also passes through an optional radiator 28 which can be operated to further limit freezing when an especially large volume of fumigant is required for a particular project, as described more fully below. The fumigant then travels in gaseous form via manifold 22, 22a and poly line conduits 32, 32a to respective drip tape elements 16,16a extending under the film components 14,14a. The fumigant is ultimately dispensed into the soil as a gas through the spaced apart dispensing holes in the drip tape elements that extend beneath the overlying film components or, in some SDI systems, beneath the soil alone. The dispensed fumigant continues to expand in its volatile gaseous state and migrates through the soil to perform the desired fumigation. The overlying film components 14,14a and the overlying soil (in the SDI version) help to prolong retention of the fumigant within the soil. The film components (and the soil depth of the SDI system) thereby prevent premature dissipation and evaporation of the fumigant into the atmosphere. As a result, the prolonged contact between the fumigant and soil improves efficacy of the product and achieves more effective fumigation of the soil.

As fumigant is dispensed from cylinder 20 in FIG. 1, scale 25 continuously measures the diminishing weight of the remaining fumigant so that the amount of fumigant that has been applied can be accurately measured and regulated as required. The throttle valve can be programmed by controller 29 to respond to the measured weight and dispense fumigant at a proper rate required for the particular size of the site involved. A similar scale may likewise be used in the SDI version of FIGS. 2 and 3.

Throttle valve 26, 26a may also be programmable by controller 29 to maintain a sufficient pressure in the fumigant conducting lines and drip tape elements for effectively resisting the refrigeration effect as described above. As a result, the low boiling point/high vapor pressure fumigant avoids freezing the conduit lines and drip tape elements, which otherwise could disrupt operation of the system and effective dispensing of fumigant into the soil. Optional radiator 28, FIG. 1, is similarly provided to heat fumigant exiting the throttle valve, if needed. In situations when larger volumes of fumigant may be required, it is especially important to prevent the fumigant being transmitted to the manifold and drip tape elements from becoming too cold and freezing. Radiator 28 may be adjusted to add sufficient ambient heat to the fumigant released through the throttle valve to prevent the fumigant from freezing and disrupting operation of the equipment. A heat exchanger may also be used with radiator 28 to extract cool air and provide cooling to a tent or other structure (e.g. shade structure) under which the fumigators are working.

After the dispensing of fumigant from cylinder 20, 20a has been completed, respective valve 26, 26a is closed (either manually or automatically). As shown in FIG. 1, an air compressor 40 may be connected to line 24 and operated to purge any remaining fumigant out through the holes in drip tape elements 16. Such a compressor may also be used in the SDI version shown in FIG. 2 for purging elements 16a. All of the fumigant is thereby efficiently dispensed into the soil beds to achieve optimal advantageous results in fumigating the soil. This compressed air effectively purges the manifolds, reels, lines, and drip tape elements of residual fumigant. As a result, the applicators are not exposed to such residual fumigant.

The system of this invention provides for significant benefits over existing soil fumigation techniques. As previously indicated, because the tarp, bed mulch or other fumigation film is applied across the beds before application of the fumigant is even commenced, the applied fumigant is retained much more effectively within the soil and off-gassing or premature dissipation of the fumigant to the atmosphere is avoided. In the alternative SDI system, the soil itself serves as an effective barrier for retaining fumigant in the soil to delay premature fumigant dissipation and achieve more effective fumigation.

Applicator safety is also enhanced. Unlike some existing fumigation systems, applicators are not required to wait until after the fumigant is injected and already dissipating into the atmosphere before they deploy the fumigation film. They are able to complete this installation and depart the site before the fumigant is applied. Only a very small number of skilled and highly trained contract workers are then needed to perform the fumigation process in accordance with this invention.

The disclosed fumigation system is likewise preferable to various known emulsification systems for performing soil fumigation. The present invention does not use any water during the application of the fumigant. This makes the system extremely advantageous for use in water restricted areas or agricultural areas where water use is highly regulated. Moreover, this new fumigation system does not introduce emulsified fumigants into the farm's irrigation supply lines or manifolds. The fumigant lines are directly connected to the drip lines. As a result, when there is a dip or change in the elevation of the grower's irrigation system supply lines, the fumigants used by the present system will not be trapped in low areas and cause damage to PVC pipes or other components of the farm's irrigation system.

The present invention uniquely employs drip tape dispensers for applying low boiling point/high vapor pressure cold gas fumigants to the soil, To date, such fumigants have been utilized only through emulsification, which exhibits the disadvantages described above. To date, drip tape has only been used for transmitting gases such as methyl bromide, which has a boiling point of 3.56° C. and must be heated and dispensed as a hot gas after being dispensed into the fumigant conducting line in order to vaporize the methyl bromide. The present invention eliminates the disadvantages typically associated with methyl bromide and other less volatile fumigants. A heat exchanger and other extraneous, heating equipment are not required in most applications employing the system of this invention.

From the foregoing it may be seen that the apparatus of this invention provides for a system for applying a "cold gas" fumigant to the soil of an agricultural planting site. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

What is claimed is:

1. A cold gas system for fumigating soil in a planting site, said system comprising:
    a pressurized source of liquid fumigant consisting of a waterless fumigant having a boiling point not greater than 0 degrees centigrade at atmospheric pressure;
    a drip element for extending across the soil, said drip element including a plurality of fumigant dispensing drip holes formed at spaced apart intervals of said drip element;
    a fumigant conductor communicably interconnecting said pressurized source of liquid fumigant and an inlet of said drip element; and
    a valve operably engaged with said fumigant conductor, said valve being selectively opened to vaporize said liquid fumigant and transmit said vaporized fumigant in a gaseous and waterless state through said fumigant conductor and into said drip element, which drip element dispenses said vaporized fumigant in said gaseous and waterless state through said drip holes into the soil, said valve being selectively closed to restrict vaporization of said liquid fumigant from said pressurized fumigant source and transmission of said vaporized fumigant through said fumigant conductor and into said drip element.

2. The system of claim 1 in which said fumigant has a boiling point not lower than −80 degrees centigrade at atmospheric pressure.

3. The system of claim 1 in which said fumigant includes a vapor pressure within the range of 35 atmospheres and 1 atmosphere.

4. The system of claim 1 in which said pressurized fumigant source includes a pressurized cylinder containing said fumigant.

5. The system of claim 4 in which said cylinder is supported on a scale that determines the weight of said fumigant in said cylinder and the amount of fumigant introduced into the soil.

6. The system of claim 1 further including a controller for regulating operation of said valve to vaporize said liquid fumigant at a controlled rate that limits refrigeration effect freezing in and around said fumigant conductor and drip element so that the flow of vaporized fumigant through said fumigant conductor and drip element is not disrupted.

7. The system of claim 1 further including a fumigation film component for applying across the soil above said drip element to impede dissipation of said dispensed vaporized fumigant from the soil and into the atmosphere, whereby said vaporized fumigant maintains prolonged contact with the soil.

8. The system of claim 1 in which said fumigant conductor includes a manifold for distributing said vaporized fumigant through a plurality of conduits to respective interconnected drip elements, each said drip element including a plurality of dispensing holes formed at, spaced apart intervals on said drip element for dispensing said vaporized fumigant therethrough and introducing said vaporized fumigant into the soil.

9. The system of claim 8 in which each tubular conduit includes a flexible tube that is wound upon a respective reel, said flexible tube being selectively retracted onto and extended from said respective reel to adjust the positioning of said drip element connected to said flexible tube.

10. The system of claim 1 further including a compressor communicably connected to said fumigant conductor between said valve and said drip element for being operated when said valve is closed to drive vaporized fumigant remaining in said fumigant conductor through said fumigant conductor and said drip element into the soil.

11. The system of claim 1 further including a radiator for healing said vaporized fumigant within said fumigant conductor to maintain said fumigant in the vaporized state until said vaporized fumigant is dispensed from said drip element.

12. A cold gas method of fumigating the soil of a planting site comprising:
    providing a pressurized source of liquid fumigant consisting of a waterless fumigant that has a boiling point of no greater than 0 degrees centigrade at atmospheric pressure;
    extending across the soil an elongate drip element having a plurality of fumigant dispersing drip holes formed at spaced apart intervals of said drip element;
    communicably interconnecting said pressurized source of liquid fumigant to an inlet of said drip element through a fumigant conductor;
    providing a valve in said fumigant conductor, which valve is selectively alternatable between open, closed and adjusted conditions;
    opening said valve to vaporize said liquid fumigant and transmit said vaporized fumigant in a gaseous and waterless state through said fumigant conductor and into said drip element;
    adjusting the valve to control the rate of flow of said vaporized fumigant through said fumigant conductor and into said drip element; and
    dispensing said vaporized fumigant in said gaseous and waterless state through said dispensing holes of said drip element and into the soil at the controlled flow rate.

13. The method of claim 12 further including the step of controlling the valve to vaporize said liquid fumigant at a rate that limits refrigeration effect freezing in and around the fumigant conductor and the interconnected drip element and at a rate proper for the size of the planting site.

14. The method of claim 12 further including the step of applying a fumigation film component over the drip tape before opening the valve to vaporize the fumigant.

15. The method of claim 12 further including the step of burying the drip element in the soil at a predetermined depth prior to opening the valve to vaporize the fumigant.

16. The method of claim 12 further including the steps of providing a flexible tube as the fumigant conductor and selectively winding the flexible tube onto and unwinding the flexible tube from a storage reel to adjust the positioning of the drip element across the soil.

17. The method of claim 12 further including the step of heating the vaporized fumigant in the fumigant conductor to maintain said fumigant in the vaporized state until said vaporized fumigant is dispensed from the drip element.

18. The method of claim 12 further including the step of introducing compressed gas through said fumigant conductor when said valve is closed to evacuate vaporized fumigant remaining in the fumigant conductor through the drip holes in the drip element.

19. The method of claim 12 in which said vaporized fumigant is transmitted through said fumigant conductor and dispensed through said dispensing holes of said drip element in a non-emulsified state.

20. A cold gas method of fumigating the soil of a planting site comprising:
    providing a pressurized source of liquid fumigant that has a boiling point of no greater than 0 degrees centigrade at atmospheric pressure;

extending across the soil an elongate drip element having a plurality of fumigant dispersing drip holes formed at spaced apart intervals of said drip element;

communicably interconnecting said pressurized source of liquid fumigant to an inlet of said drip element through a fumigant conductor;

providing a valve in said fumigant conductor, which valve is selectively alternatable between open and closed conditions;

opening said valve to vaporize said liquid fumigant and transmit said vaporized fumigant through said fumigant conductor and into said drip element;

allowing said vaporized fumigant to be dispensed through said dispensing holes of said drip element and introduced into the soil; and providing flexible tube as the fumigant conductor and selectively winding the flexible tube and unwinding the flexible tube from a storage reel to adjust the positioning of the drip element across the soil.

\* \* \* \* \*